United States Patent
Kunugi et al.

(10) Patent No.: US 9,408,119 B2
(45) Date of Patent: Aug. 2, 2016

(54) WIRELESS ACCESS SYSTEM, BASE STATION, AND COMMUNICATION TERMINAL

(71) Applicant: FUJITSU LIMITED, Kawasaki-shi, Kanagawa (JP)

(72) Inventors: Takeshi Kunugi, Yokohama (JP); Noboru Hasegawa, Oota (JP); Akihiro Kobayashi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/500,257

(22) Filed: Sep. 29, 2014

(65) Prior Publication Data
US 2015/0163708 A1    Jun. 11, 2015

(30) Foreign Application Priority Data
Dec. 10, 2013 (JP) .................... 2013-255367

(51) Int. Cl.
*H04W 88/06* (2009.01)
*H04W 84/12* (2009.01)
*H04W 76/02* (2009.01)
*H04W 36/00* (2009.01)

(52) U.S. Cl.
CPC ...... *H04W 36/0066* (2013.01); *H04W 36/0072* (2013.01); *H04W 76/026* (2013.01); *H04W 84/12* (2013.01); *H04W 88/06* (2013.01)

(58) Field of Classification Search
CPC ..... H04W 48/04; H04W 60/04; H04W 84/02; H04W 84/04; H04W 84/12; H04W 88/022; H04W 88/04; H04W 88/08; H04W 88/10
See application file for complete search history.

(56) References Cited

U.S. PATENT DOCUMENTS

| 2004/0176024 A1* | 9/2004 | Hsu ....................... H04L 12/189 455/3.04 |
| 2015/0030001 A1* | 1/2015 | Koskinen ................ H04W 8/08 370/331 |
| 2015/0208308 A1* | 7/2015 | Watanabe ............. H04W 36/08 455/436 |

FOREIGN PATENT DOCUMENTS

| JP | 2010-004458 | 1/2010 |
| JP | 2012-208885 | 10/2012 |
| WO | 2010110216 | 9/2010 |

* cited by examiner

*Primary Examiner* — Christopher M Brandt
*Assistant Examiner* — Martin Chang
(74) *Attorney, Agent, or Firm* — Fujitsu Patent Center (57) ABSTRACT

A wireless access system includes: a first communication system that performs communications by a first communication scheme; a second communication system that performs communications by a second communication scheme different from the first communication scheme; and a communication terminal capable of communicating with both the first communication system and the second communication system. A base station of the first communication system transmits, to the communication terminal, a threshold value in accordance with an elapsed time is measured from a first point in time at which the communication terminal previously enters a second communication area that is an area of the second communication system to a second point in time at which the communication terminal previously exits from the second communication area to a first communication area that is an area of the first communication system.

6 Claims, 9 Drawing Sheets

| SSID | THRESHOLD VALUE |
|------|-----------------|
| XXXX | 66 SECONDS |
| YYYY | 30 SECONDS |
| ZZZZ | 120 SECONDS |

FIG.8

| SSID | THRESHOLD VALUE |
|------|-----------------|
| XXXX | 75 SECONDS |
| YYYY | 45 SECONDS |
| ZZZZ | 135 SECONDS |

WIRELESS ACCESS SYSTEM, BASE STATION, AND COMMUNICATION TERMINAL

CROSS-REFERENCE TO RELATED APPLICATION

This application is based upon and claims the benefit of priority of the prior Japanese Patent Application No. 2013-255367, filed on Dec. 10, 2013, the entire contents of which are incorporated herein by reference.

FIELD

The embodiments discussed herein are related to a wireless access system, a base station, and a communication terminal.

BACKGROUND

Various techniques have been devised to increase the transmission capacity of a wireless access system (hereinafter which may also be referred to as the "system capacity"). For example, there is a technique available to increase the system capacity by providing a femto-base station for forming a small communication area of about 10 meters in radius in addition to a macro base station for forming a large communication area which is several hundreds of meters to several kilometers in radius. Here, the "communication area" is defined as the area which the radio waves transmitted from the base station cover at predetermined power or greater. For example, the macro base station is capable of transmitting at high transmission power, whereas the femto-base station transmits at low transmission power. Furthermore, for example, implemented in the macro base station unit is the function of a base station for forming a communication area by the 3G communication scheme (hereinafter which may also be referred to as the "3G base station"). On the other hand, for example, implemented in the femto-base station unit may be the function of a base station for forming a communication area by the 3G communication scheme and the function of a base station for forming a communication area by the WiFi communication scheme (hereinafter which may also be referred to as the "WiFi base station"). Hereinafter, the communication area formed by the 3G communication scheme will also be referred to as "the 3G area," while the communication area formed by the WiFi communication scheme will also be referred to as "the WiFi area." Furthermore, the communication system for performing communications by the 3G communication scheme will also be referred to as "the 3G system," while the communication system for performing communications by the WiFi communication scheme will also be referred to as "the WiFi system." That is, the 3G system forms the 3G area, while the WiFi system forms the WiFi area. Note that the WiFi base station may also be called "the WiFi access point."

The communication terminal having both the communication functions of the 3G and the WiFi switches the destination, to which the communication terminal is connected, from the 3G system to the WiFi system upon entry to the WiFi area, while switching the destination, to which the communication terminal is connected, from the WiFi system to the 3G system upon exit from the WiFi area. Such switching of the destination to which the communication terminal is connected may be called the "handover." The switching of the destination, to which the communication terminal is connected, from the 3G system to the WiFi system is not originated by the control provided from the 3G network but driven by the communication terminal.

[Patent Document 1] International Publication Pamphlet No. WO2010/110216
[Patent Document 2] Japanese Laid-open Patent Publication No. 2010-004458
[Patent Document 3] Japanese Laid-open Patent Publication No. 2012-208885

The communication terminal in the wireless access system has mobility when compared with the wired communication terminal, so that even when having entered a communication area, the communication terminal may exit the communication area in a short time. For example, suppose that a communication terminal user buys takeout goods at a fast-food restaurant or the like at which a WiFi base station is provided to form a WiFi area or an example communication area. In this case, the user may exit the WiFi area or the restaurant in a short time. Furthermore, the communication terminal moving near the boundary of the WiFi area may exit the WiFi area in a short time after having once entered the WiFi area. In such a case, the destination to which the communication terminal is connected is once switched from the 3G system to the WiFi system, and in a short time after that, the destination is switched from the WiFi system back to the 3G system. That is, the RAT switching such as handover occurs frequently. Frequent occurrence of handover between communication systems that employ different communication schemes may lead to increases in the exchange of control signals for ending or starting connections, causing increases in communication traffic. Furthermore, since seamless handover is not ensured between communication systems employing different communication schemes, frequent occurrence of handovers may lead to degradation in data quality due to increases in data loss or the like.

SUMMARY

According to an aspect of the embodiments, a wireless access system includes: a first communication system that performs communications by a first communication scheme; a second communication system that performs communications by a second communication scheme different from the first communication scheme; and a communication terminal capable of communicating with both the first communication system and the second communication system. A base station of the first communication system transmits, to the communication terminal, a threshold value in accordance with an elapsed time is measured from a first point in time at which the communication terminal previously enters a second communication area that is an area of the second communication system to a second point in time at which the communication terminal previously exits from the second communication area to a first communication area that is an area of the first communication system. The communication terminal receives the threshold value from the base station of the first communication system while staying in the first communication area of the first communication system and inhibits a start of connection to the second communication area until a point in time at which an elapsed time after reception strength in the second communication area meets a predetermined condition exceeds the threshold value when the reception strength in the second communication area meets the predetermined condition.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Preferred embodiments will be explained with reference to accompanying drawings. Note that the wireless access system, the base station, and the communication terminal disclosed in the present application will not be restricted by these embodiments. Furthermore, in each of the embodiments, the same symbols will be given to the arrangements having the same functions and the steps for performing the same processing, with repeated explanations omitted.

[a] First Embodiment

Example of Arrangement of Wireless Access System

Figure 1:
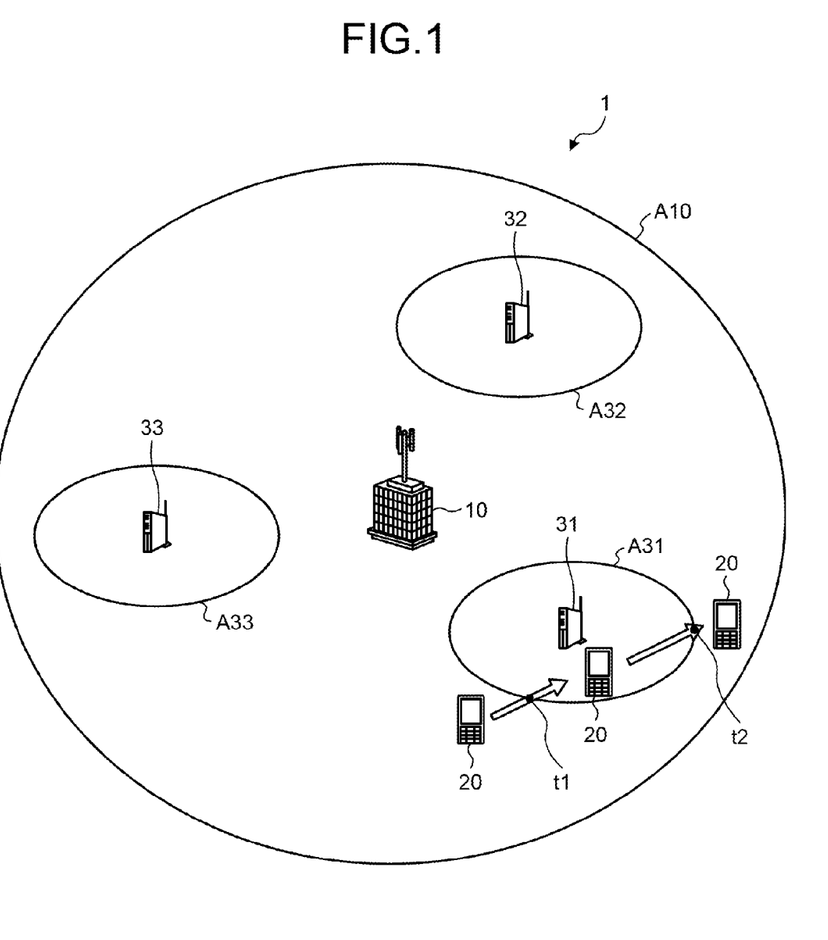
FIG. 1 is a view illustrating an example of an arrangement of a wireless access system according to a first embodiment.

FIG. 1 is a view illustrating an example of an arrangement of a wireless access system according to a first embodiment. In FIG. 1, a wireless access system 1 includes a 3G base station 10, WiFi base stations 31, 32, and 33, and a communication terminal 20.

The 3G base station 10 forms a 3G area A10 in a 3G system in which communications are performed by the 3G communication scheme. The WiFi base stations 31, 32, and 33 form WiFi areas A31, A32, and A33, respectively, in a WiFi system in which communications are performed by the WiFi communication scheme. That is, the wireless access system 1 has the 3G system and the WiFi system, the 3G system has the 3G base station 10, and the WiFi system has the WiFi base stations 31, 32, and 33. Furthermore, the 3G area A10 and each of the WiFi areas A31, A32, and A33 overlap each other as illustrated in FIG. 1. That is, for example, the entire WiFi area A31 overlaps part of the 3G area A10. Hereafter, the WiFi base stations 31, 32, and 33 may also be referred to collectively as a WiFi base station 30 when not being distinguished from each other, while the WiFi areas A31, A32, and A33 may also be referred to collectively as the WiFi area A30 when not being distinguished from each other.

The communication terminal 20 is capable of communicating with both the 3G system and the WiFi system. When being located in an area that does not overlap the WiFi area A30 in the 3G area A10, the communication terminal 20 communicates with the 3G base station 10 by the 3G communication scheme. Furthermore, when being located in the WiFi area A30, the communication terminal 20 is on standby for execution of switching processing, whereby the destination to which the communication terminal 20 is connected is switched from the 3G base station 10 to the WiFi base station 30, based on an "elapsed time" that is measured in advance by the 3G base station 10. That is, the communication terminal 20 would not switch at once the destination, to which the communication terminal 20 is connected, from the 3G system to the WiFi system even when having entered the WiFi area A30 from the 3G area A10. For example, the communication terminal 20 located in the WiFi area A30 would not switch the destination, to which the communication terminal 20 is connected, from the 3G base station 10 to the WiFi base station 30 until the residence time in the WiFi area A30 satisfies "a predetermined condition." Then, when the residence time in the WiFi area A30 satisfies "the predetermined condition," the communication terminal 20 located in the WiFi area A30 switches the destination, to which the communication terminal 20 is connected, from the 3G system to the WiFi system.

Here, "the elapsed time" is measured in advance by the 3G base station 10 that is in "a measurement mode." The 3G base station 10 measures "the elapsed time" for each of the WiFi areas A31, A32, and A33. For example, as the elapsed time in the WiFi area A31, the 3G base station 10 measures in advance the elapsed time from the point in time t1 at which the communication terminal 20 enters the WiFi area A31 from the 3G area A10 to the point in time t2 at which the communication terminal 20 exits from the WiFi area A31 to the 3G area A10. The 3G base station 10 repeats the measurement of the elapsed time in the WiFi area A31 each time the communication terminal 20 enters the WiFi area A31. Note that communication terminals 20 may not be the same communication terminal but may also be a plurality of communication terminals that are capable of communicating with both the 3G system and the WiFi system. The 3G base station 10 also measures the elapsed time in the WiFi areas A32 and A33 in advance in the same manner as in the WiFi area A31.

On the other hand, the "predetermined condition" for the residence time in the WiFi area A30 is specified using a threshold value computed by the 3G base station 10 in a "handover restricted mode" based on "the elapsed time." That is, the residence time does not satisfy the predetermined condition when the residence time is less than the threshold value, whereas the residence time satisfies the predetermined condition when the residence time is equal to or greater than the threshold value. For example, the communication terminal 20 located in the WiFi area A31 will not switch the destination, to which the communication terminal 20 is connected, from the 3G base station 10 to the WiFi base station 31 while the residence time in the WiFi area A31 is less than the threshold value in the WiFi area A31. On the other hand, when the residence time in the WiFi area A31 is equal to or greater than the threshold value in the WiFi area A31, the communication terminal 20 located in the WiFi area A31 will switch the destination, to which the communication terminal 20 is connected, from the 3G base station 10 to the WiFi base station 31. The communication terminal 20 is also on standby for execution of a handover to the WiFi base stations 32 and 33 in the WiFi areas A32 and A33 in the same manner as in the WiFi area A31.

Therefore, even once the communication terminal 20 enters the WiFi area A30, the handover from the 3G system to the WiFi system will not be executed when the communication terminal 20 exits from the WiFi area A30 after a short stay and thus the residence time in the WiFi area A30 is short. In other words, even when the communication terminal 20 enters the WiFi area A30, the connection between the communication terminal 20 and the 3G system is maintained when the residence time of the communication terminal 20 in the WiFi area A30 is short.

Example of Configuration of 3G Base Station

Figure 2:
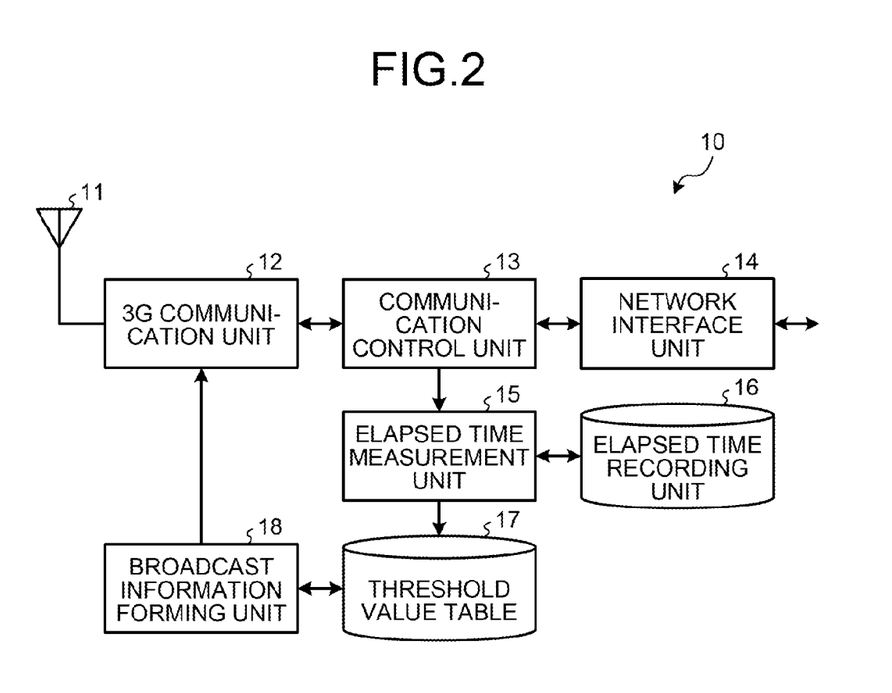
FIG. 2 is a functional block diagram illustrating an example of a 3G base station according to the first embodiment.

FIG. 2 is a functional block diagram illustrating an example 3G base station according to the first embodiment. The 3G base station 10 illustrated in FIG. 2 includes an antenna 11, a 3G communication unit 12, a communication control unit 13, a network interface unit 14, an elapsed time measurement unit 15, an elapsed time recording unit 16, a threshold value table 17, and a broadcast information forming unit 18.

The 3G communication unit 12 communicates with the communication terminal 20 via the antenna 11 according to the 3G communication scheme. In particular, the 3G communication unit 12 transmits to the communication terminal 20 and receives from the communication terminal 20 the control information that is used to control the connection between the 3G base station 10 and the communication terminal 20.

The communication control unit 13 provides control in a variety of ways to communications between the 3G base station 10 and the communication terminal 20.

The network interface unit 14 communicates with a 3G core network (which hereinafter may also be referred to as the "3G_CN").

The elapsed time measurement unit 15 measures in advance the elapsed time, for each WiFi area A30, from the point in time at which the communication terminal 20 enters the WiFi area A30 from the 3G area A10 to the point in time at which the communication terminal 20 exits from the WiFi area A30 to the 3G area A10. The elapsed time measurement unit 15 records the measured elapsed time in the elapsed time recording unit 16. Furthermore, based on the elapsed time recorded in the elapsed time recording unit 16, the elapsed time measurement unit 15 computes, for each WiFi area A30, the threshold value of the residence time of the communication terminal 20 in the WiFi area A30 so as to create a threshold value table 17 to which the computed threshold values are set. That is, the threshold value table 17 is created based on the elapsed time.

The broadcast information forming unit 18 forms broadcast information that includes the contents of the threshold value table 17.

Example of Configuration of Communication Terminal

Figure 3:
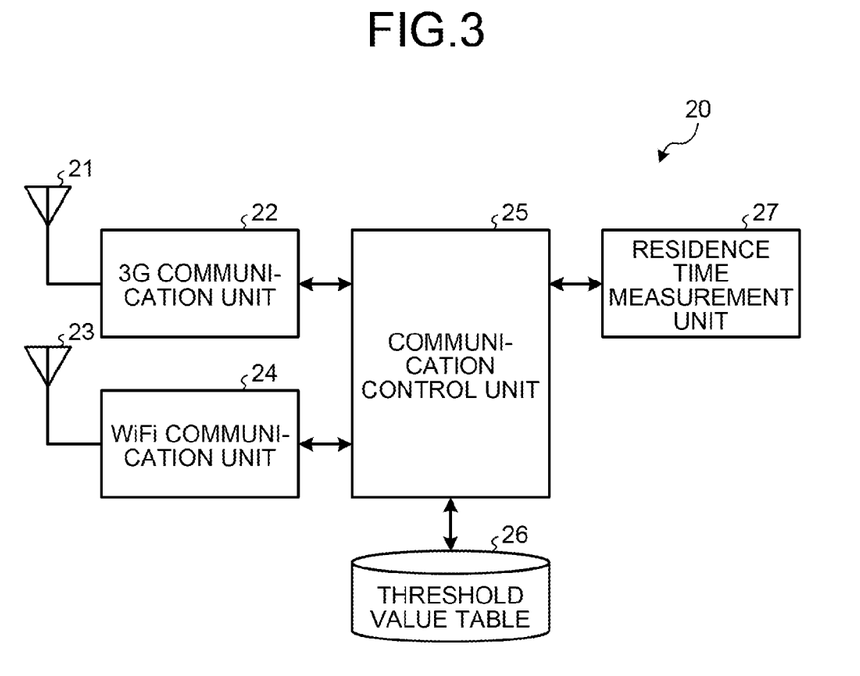
FIG. 3 is a functional block diagram illustrating an example of a communication terminal according to the first embodiment.

FIG. 3 is a functional block diagram illustrating an example communication terminal according to the first embodiment. The communication terminal 20 illustrated in FIG. 3 includes an antenna 21, a 3G communication unit 22, an antenna 23, a WiFi communication unit 24, a communication control unit 25, a threshold value table 26, and a residence time measurement unit 27.

The 3G communication unit 22 communicates with the 3G system via the antenna 21 according to the 3G communication scheme. In particular, the 3G communication unit 22 transmits to the 3G base station 10 and receives from the 3G base station 10 the control information that is used to control the connection between the communication terminal 20 and the 3G base station 10.

The WiFi communication unit 24 communicates with the WiFi system via the antenna 23 according to the WiFi communication scheme.

The communication control unit 25 provides control in a variety of ways to communications between the communication terminal 20 and the 3G system and as well provides control in a variety of ways to communications between the communication terminal 20 and the WiFi system. In particular, when the communication terminal 20 receives from the 3G base station 10 the broadcast information that includes the contents of the threshold value table 17, the communication control unit 25 creates the threshold value table 26 based on the contents.

The residence time measurement unit 27 measures the residence time of the communication terminal 20 in the WiFi area A30.

Processing Sequence of Wireless Access System

Figure 4:
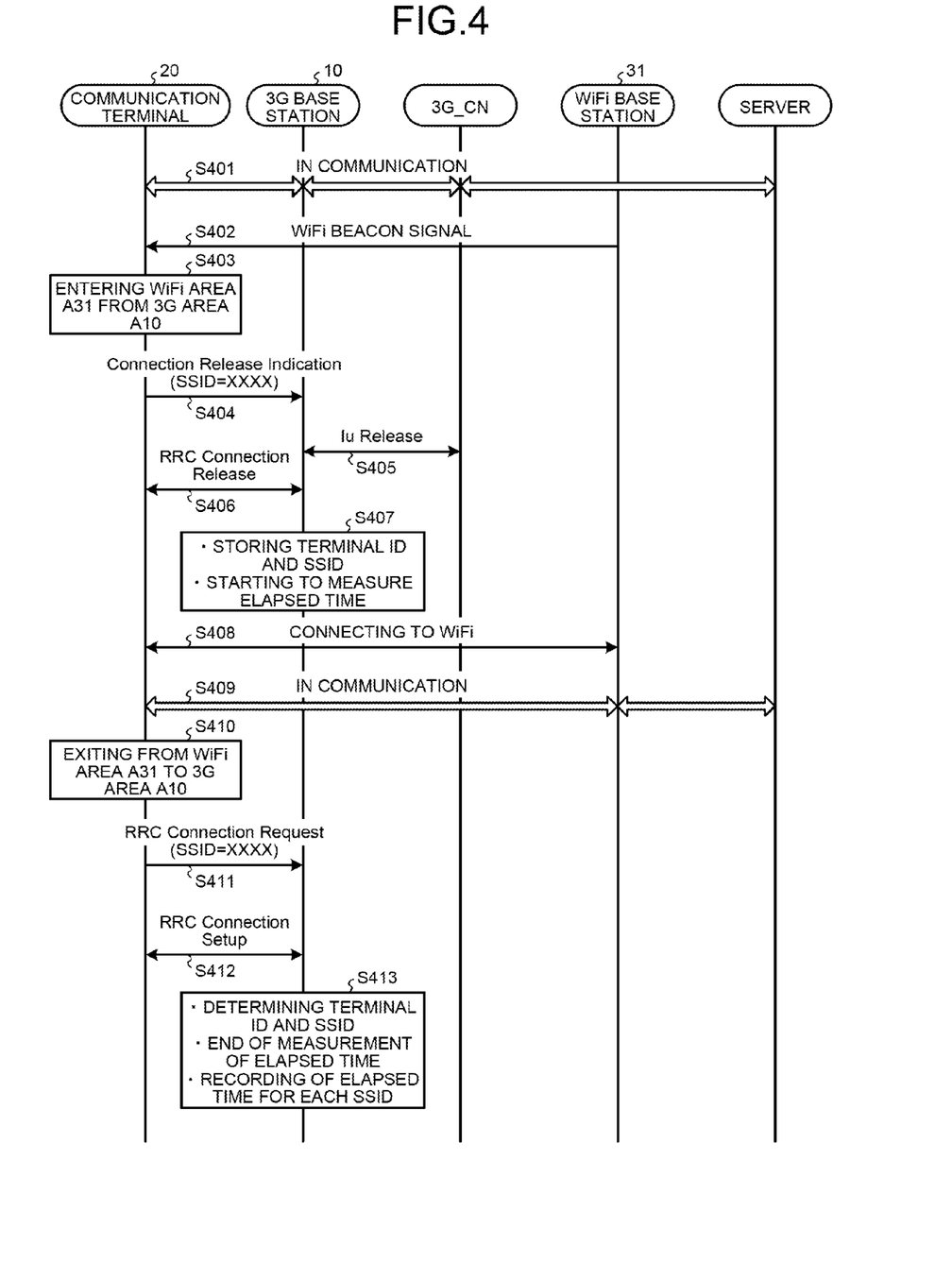
FIG. 4 is a view illustrating an example of a processing sequence of the wireless access system according to the first embodiment.
Figure 5:
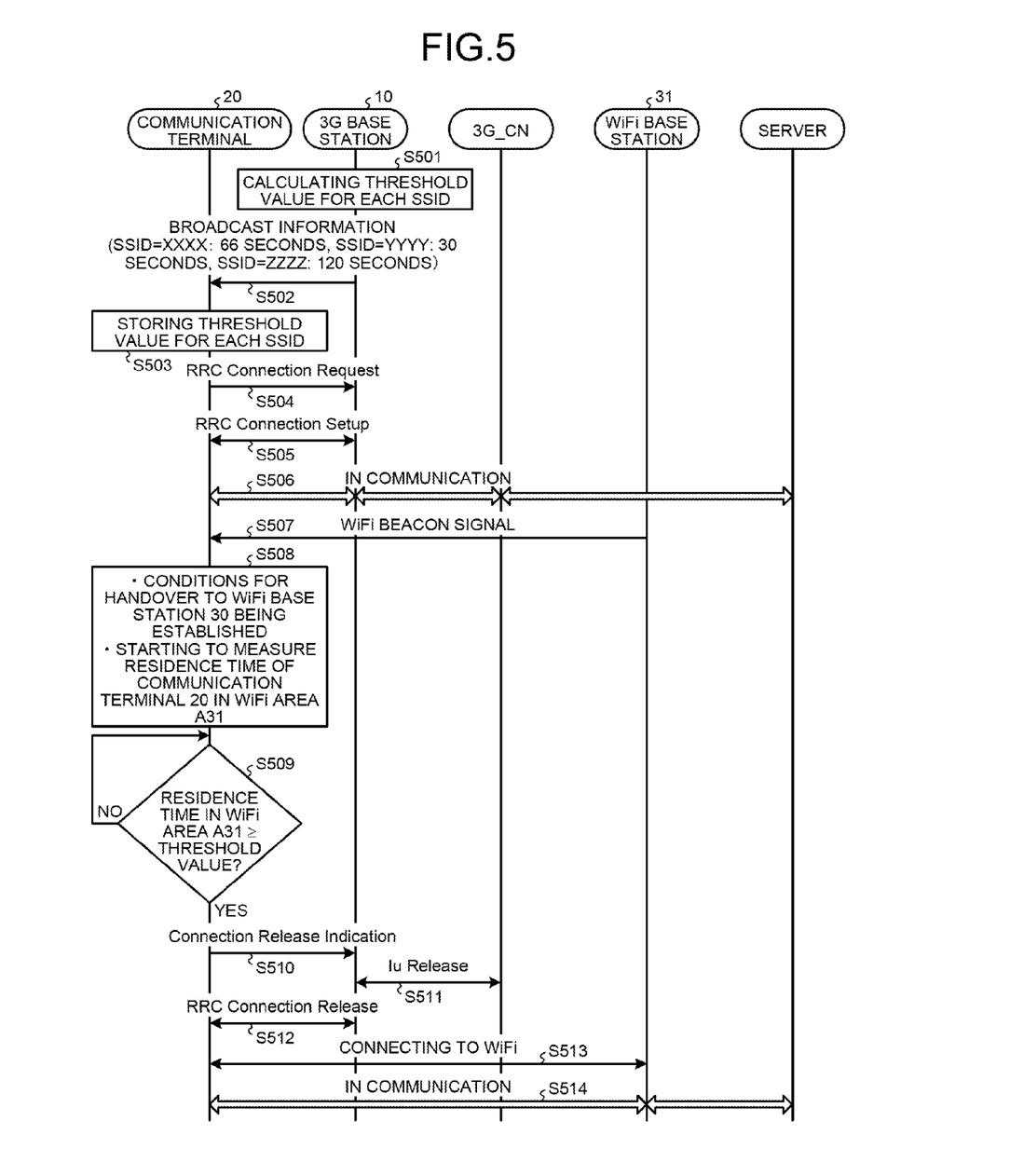
FIG. 5 is a view illustrating an example of a processing sequence of the wireless access system according to the first embodiment.

FIGS. 4 and 5 are views illustrating an example of a processing sequence of the wireless access system according to the first embodiment. FIG. 4 illustrates a processing sequence performed when the 3G base station 10 and the communication terminal 20 are in "the measurement mode," and FIG. 5 illustrates a processing sequence performed when the 3G base station 10 and the communication terminal 20 are in "the handover restricted mode." The measurement mode is executed, for example, for a predetermined duration in predetermined execution periods, whereas the handover restricted mode is executed in any duration except the durations in which the measurement mode is executed. For example, the measurement mode is executed for 24 hours from 12 midnight on the first day of each month, and the handover restricted mode is executed from 12 midnight on the second day of each month onwards. On the other hand, the user of the communication terminal 20 may also choose whether to execute the handover restricted mode.

Now, a description will be made separately to "the measurement mode" and "the handover restricted mode." Furthermore, among the WiFi base stations 31, 32, and 33, the WiFi base station 31 will be described by way of example. Furthermore, for example, the WiFi base station 31 has an "SSID (Service Set Identifier)=XXXX;" the WiFi base station 32 has an "SSID=YYYY," and the WiFi base station 33 has an "SSID=ZZZZ."

Measurement Mode: FIG. 4

In FIG. 4, in step S401, the communication terminal 20 is connected to the 3G base station 10 so as to be communicating with a server via the 3G base station 10 and the 3G_CN. That is, the network interface unit 14 of the 3G base station 10 outputs data received from the 3G_CN to the 3G communication unit 12 via the communication control unit 13, and the 3G communication unit 12 in turn transmits the received data to the communication terminal 20. On the other hand, the 3G communication unit 12 of the 3G base station 10 outputs the data received from the communication terminal 20 to the network interface unit 14 via the communication control unit 13, and the network interface unit 14 in turn transmits the received data to the 3G_CN.

In step S402, the WiFi base station 31 transmits a WiFi beacon signal. The area which the WiFi beacon signal can reach at predetermined power or greater is defined as the WiFi area A31. Furthermore, the WiFi beacon signal includes "XXXX" or the SSID of the WiFi base station 31.

In step S403, the communication terminal 20 enters the WiFi area A31 from the 3G area A10. At this time, the WiFi communication unit 24 of the communication terminal 20 receives and outputs the WiFi beacon signal, which includes the "SSID=XXXX", to the communication control unit 25. The communication control unit 25 stores the "SSID=XXXX."

In step S404, the communication control unit 25 of the communication terminal 20 forms and outputs, to the 3G communication unit 22, the Connection Release Indication that includes the "SSID=XXXX" and the ID of the communication terminal 20. The 3G communication unit 22 transmits the Connection Release Indication to the 3G base station 10.

In step S405, the 3G communication unit 12 of the 3G base station 10 outputs the Connection Release Indication received from the communication terminal 20 to the communication control unit 13. Then, the communication control unit 13 executes the Iu Release procedure between the same and the 3G_CN. This causes the connection between the 3G base station 10 and the 3G_CN to be disconnected.

In step S406, the communication control unit 13 of the 3G base station 10 executes the RRC Connection Release procedure with the communication control unit 25 of the communication terminal 20. This causes the connection between the 3G base station 10 and the communication terminal 20 to be disconnected.

In step S407, the communication control unit 13 of the 3G base station 10 extracts and stores the "SSID=XXXX" and the ID of the communication terminal 20 from the Connection Release Indication. Furthermore, the communication control unit 13 outputs the extracted "SSID=XXXX" to the elapsed time measurement unit 15 as well as commands the elapsed time measurement unit 15 to start to measure the elapsed time. Following the measurement start command, the elapsed time measurement unit 15 starts the measurement of the elapsed time in the WiFi area A31 corresponding to the "SSID=XXXX."

In step S408, the connection between the communication terminal 20 and the WiFi base station 31 is established.

In step S409, the communication terminal 20 located in the WiFi area A31 is in communication with the server via the WiFi base station 31. That is, the WiFi communication unit 24 of the communication terminal 20 communicates with the WiFi base station 31.

In step S410, the communication terminal 20 exits from the WiFi area A31 to the 3G area A10. At this time, since the reception of the WiFi beacon signal including the "SSID=XXXX" is discontinued, the WiFi communication unit 24 of the communication terminal 20 ends the input of the beacon signal to the communication control unit 25. In this context, in step S411, the communication control unit 25 forms and outputs, to the 3G communication unit 22, the RRC Connection Request which includes the ID of the communication terminal 20 and the "SSID=XXXX" stored in step S403. The 3G communication unit 22 transmits the RRC Connection Request to the 3G base station 10.

In step S412, the 3G communication unit 12 of the 3G base station 10 outputs the RRC Connection Request received from the communication terminal 20 to the communication control unit 13. Having received the RRC Connection Request, the communication control unit 13 executes the RRC Connection Setup procedure between the same and the communication control unit 25 of the communication terminal 20. This allows for establishing the connection between the 3G base station 10 and the communication terminal 20.

In step S413, the 3G communication unit 12 of the 3G base station 10 outputs the RRC Connection Request received from the communication terminal 20 to the communication control unit 13. The communication control unit 13 determines whether the communication terminal ID and the SSID included in the RRC Connection Request coincide with the communication terminal ID and the SSID stored in step S407. When both do not coincide, the communication control unit 13 does not command the elapsed time measurement unit 15 to end the measurement of the elapsed time, thus allowing the measurement of the elapsed time to be continued. On the other hand, when both coincide, the communication control unit 13 commands the elapsed time measurement unit 15 to end the measurement of the elapsed time. Following the command to end the measurement, the elapsed time measurement unit 15 ends the measurement of the elapsed time in the WiFi area A31 corresponding to the "SSID=XXXX." Then, the elapsed time measurement unit 15 records the elapsed time for each SSID in the elapsed time recording unit 16. Note that the elapsed time measurement unit 15 stops the measurement of the elapsed time when the elapsed time being measured has reached a predetermined threshold value while not being commanded to end the measurement of the elapsed time.

In the measurement mode, the measurement and recording of the elapsed time mentioned above are repeated for each SSID, that is, for each WiFi area A30 each time the communication terminal 20 enters the WiFi area A30.

Handover Restricted Mode: FIG. 5

In FIG. 5, in step S501, based on the elapsed time recorded in the elapsed time recording unit 16, the elapsed time measurement unit 15 of the 3G base station 10 computes the threshold value of the residence time of the communication terminal 20 in the WiFi area A30 for each SSID, that is, for each WiFi area A30. For example, the elapsed time measurement unit 15 computes the threshold value of the residence time in the WiFi area A31 as follows.

Figure 6:
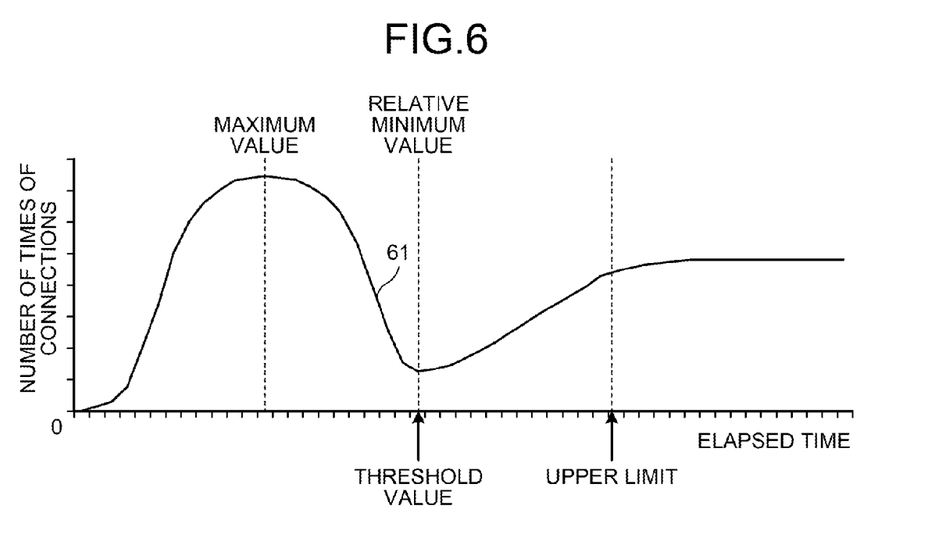
FIG. 6 is an explanatory view illustrating the computation of threshold values according to the first embodiment.
Figure 7:
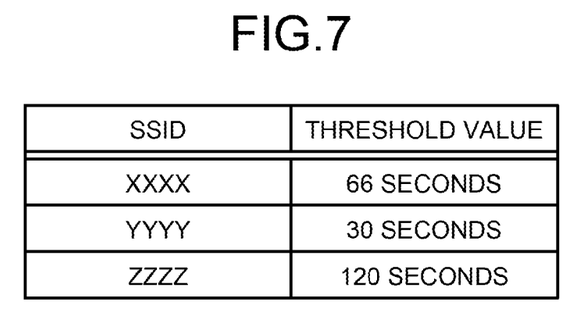
FIG. 7 is a view illustrating an example of a threshold value table according to the first embodiment.

FIG. 6 is an explanatory view illustrating the computation of the threshold value according to the first embodiment. The elapsed time measurement unit 15 determines a histogram 61 as illustrated in FIG. 6 using a plurality of elapsed times corresponding to the "SSID=XXXX" among the elapsed times recorded in the elapsed time recording unit 16 in a predetermined duration. That is, the elapsed time measurement unit 15 determines the histogram with the horizontal axis representing the elapsed time and the vertical axis representing the number of times of connecting between the communication terminal 20 and the WiFi base station 31. In the measurement mode, since the elapsed time is measured each time the communication terminal 20 is connected to the WiFi base station 31, the number of times of connections represented by the vertical axis is equivalent to the number of sample elapsed times. On the other hand, for example, the elapsed time represented by the horizontal axis has a unit width of three seconds. Then, in the histogram 61, in a range less than a predetermined upper limit of the elapsed time, the elapsed time measurement unit 15 computes, as the threshold value of the residence time, a particular elapsed time corresponding to the relative minimum value of the number of times of connections that appears for the first time after the maximum value of the number of times of connections as the elapsed time increases from zero. Therefore, for example, in the histogram 61, the threshold value is computed to be 66 seconds (rounded down to the nearest whole number). As described above, the elapsed time measurement unit 15 computes the threshold value of the residence time using the statistics on the elapsed times for each SSID, that is, for each WiFi area A30. Then, as illustrated in FIG. 7, the elapsed time measurement unit 15 creates the threshold value table 17 in which the computed threshold value is set corresponding to the SSID. That is, the threshold value table 17 is created based on the elapsed time measured by the elapsed time measurement unit 15. FIG. 7 is a view illustrating an example of the threshold value table according to the first embodiment.

Referring back to FIG. 5, in step S502, the broadcast information forming unit 18 of the 3G base station 10 forms and outputs to the 3G communication unit 12 the broadcast information that includes the contents of the threshold value table 17. The 3G communication unit 12 transmits this broadcast information to the communication terminal 20. The contents of the threshold value table 17 are equivalent to the information based on the elapsed time measured by the elapsed time measurement unit 15.

In step S503, the 3G communication unit 22 of the communication terminal 20 receives and outputs to the communication control unit 25 the broadcast information that includes the contents of the threshold value table 17. The communication control unit 25 extracts the contents of the threshold value table 17 from this broadcast information and creates the threshold value table 26 based on the extracted contents. That is, the communication terminal 20 stores the threshold value for each SSID. Therefore, the contents of the threshold value table 26 are the same as the contents of the threshold value table 17 (FIG. 7).

It is sufficient to perform the processing in steps S501 to S503 only once after the measurement mode is ended.

In step S504, the communication control unit 25 of the communication terminal 20 forms and outputs to the 3G communication unit 22 the RRC Connection Request that includes the ID of the communication terminal 20, and the 3G communication unit 22 transmits the RRC Connection Request to the 3G base station 10.

In step S505, the 3G communication unit 12 of the 3G base station 10 outputs the RRC Connection Request received from the communication terminal 20 to the communication control unit 13. Then, the communication control unit 13 executes the RRC Connection Setup procedure between the same and the communication control unit 25 of the communication terminal 20. This allows for establishing the connection between the 3G base station 10 and the communication terminal 20.

In step S506, the communication terminal 20 is in communication with the server via the 3G base station 10 and the 3G_CN. That is, the network interface unit 14 of the 3G base station 10 outputs the data received from the 3G_CN to the 3G communication unit 12 via the communication control unit 13, and the 3G communication unit 12 transmits the received data to the communication terminal 20. On the other hand, the 3G communication unit 12 of the 3G base station 10 outputs the data received from the communication terminal 20 to the network interface unit 14 via the communication control unit 13, and the network interface unit 14 transmits the received data to the 3G_CN.

In step S507, the WiFi base station 31 transmits the WiFi beacon signal. The WiFi beacon signal includes the "XXXX" or the SSID of the WiFi base station 31.

In step S508, the communication terminal 20 enters the WiFi area A31 from the 3G area A10. At this time, the WiFi communication unit 24 of the communication terminal 20 receives the WiFi beacon signal including the "SSID=XXXX" and outputs the signal to the communication control unit 25. When the condition for handover to the WiFi base station 30 is satisfied, the communication control unit 25 informs the residence time measurement unit 27 of the fact that the condition has been satisfied. The communication control unit 25 also informs the residence time measurement unit 27 of the "SSID=XXXX." For example, the handover condition is satisfied when the reception strength of the WiFi beacon signal has reached a predetermined threshold value or greater. The residence time measurement unit 27 that has been informed of the fact that the handover condition is satisfied starts to measure the residence time corresponding to the "SSID=XXXX," that is, the residence time of the communication terminal 20 in the WiFi area A31. Furthermore, the communication control unit 25 acquires, from the threshold value table 26, the threshold value corresponding to the "SSID=XXXX." For example, the communication control unit 25 acquires, from the threshold value table 26, a threshold value of 66 seconds which corresponds to the "SSID=XXXX."

In step S509, the communication control unit 25 of the communication terminal 20 monitors the residence time measured by the residence time measurement unit 27, so that when the residence time is less than the threshold value (Step S509: No), the communication control unit 25 is on standby for switching the destination, to which the communication terminal 20 is connected, from the 3G base station 10 to the WiFi base station 31. For example, while the residence time is less than the threshold value, the communication control unit 25 is on standby for forming the Connection Release Indication for disconnecting the connection to the 3G base station 10 and on standby for output to the 3G communication unit 22. Then, at the point in time at which the residence time measured by the residence time measurement unit 27 reaches the threshold value or greater (Step S509: Yes), the communication control unit 25 forms the Connection Release Indication that includes the ID of the communication terminal 20 for output to the 3G communication unit 22. The 3G communication unit 22 transmits the Connection Release Indication to the 3G base station 10 (Step S510). Users of communication terminals 20 of which residence time is less than the threshold value are classified into short-term stayers, whereas those users of communication terminals 20 of which residence time is the threshold value or greater are classified into long-term stayers.

In step S511, the 3G communication unit 12 of the 3G base station 10 outputs the Connection Release Indication received from the communication terminal 20 to the communication control unit 13. Then, the communication control unit 13 executes the Iu Release procedure between the same and the 3G_CN. This causes the connection between the 3G base station 10 and the 3G_CN to be disconnected.

In step S512, the communication control unit 13 of the 3G base station 10 executes the RRC Connection Release procedure between the same and the communication control unit 25 of the communication terminal 20. This causes the connection between the 3G base station 10 and the communication terminal 20 to be disconnected.

In step S513, the connection between the communication terminal 20 and the WiFi base station 31 is established.

In step S514, the communication terminal 20 located in the WiFi area A31 is in communication with the server via the WiFi base station 31. That is, the WiFi communication unit 24 of the communication terminal 20 communicates with the WiFi base station 31.

Note that when the reception strength of the WiFi beacon signal becomes the predetermined threshold value or less before the residence time measured by the residence time measurement unit 27 becomes the threshold value or greater, the residence time measurement unit 27 ends the measurement of the residence time.

As described above, according to this embodiment, the wireless access system 1 includes the 3G system, the WiFi system, and the communication terminal 20 that is capable of communicating with both the 3G system and the WiFi system. The wireless access system 1 measures in advance the elapsed time from the first point in time t1 at which the communication terminal 20 enters the WiFi area A31 from the 3G area A10 to the second point in time t2 at which the communication terminal 20 exits from the WiFi area A31 to the 3G area A10. Then, while the communication terminal 20 is located in the WiFi area A31 after the measurement of the elapsed time, the communication terminal 20 is on standby for switching the destination, to which the communication terminal 20 is connected, from the 3G system to the WiFi system based on the elapsed time.

Furthermore, the 3G base station 10 forms the 3G area A10 according to the 3G communication scheme. The 3G base station 10 has the elapsed time measurement unit 15 and the 3G communication unit 12. The elapsed time measurement unit 15 measures in advance the elapsed time from the first point in time t1 at which the communication terminal 20 enters the WiFi area A31 from the 3G area A10 to the second point in time t2 at which the communication terminal 20 exits from the WiFi area A31 to the 3G area A10. The 3G communication unit 12 transmits, to the communication terminal 20, the information based on the elapsed time that has been measured in advance.

Furthermore, the communication terminal 20 has the 3G communication unit 22 and the communication control unit 25. The 3G communication unit 22 receives the information based on the elapsed time that has been measured in advance. While the communication terminal 20 is located in the WiFi area A31 after the measurement of the elapsed time, the communication control unit 25 is on standby for switching the destination, to which the communication terminal 20 is connected, from the 3G system to the WiFi system based on the elapsed time.

For example, the communication terminal 20 is on standby for execution of the aforementioned switching processing when the residence time in the WiFi area A31 is less than the threshold value calculated based on the elapsed time measured in advance in the WiFi area A31.

This allows for reducing the occurrence of frequent handovers between the 3G system and the WiFi system. It is therefore possible to prevent increases in the exchange of control signals following handovers and thus prevent an increase in communication traffic. It is also possible to prevent degradation in data quality that may result from an increase in data loss due to the occurrence of frequent handovers.

Furthermore, the communication terminal 20 is on standby for execution of the aforementioned switching processing based on the elapsed time corresponding to the WiFi area A31, in which the communication terminal is staying, of the WiFi areas A31, A32, and A33.

This allows for providing different standby standards for execution of the switching processing in each of a plurality of WiFi areas in which measured are elapsed times different from each other. It is thus possible for the communication terminal to be on standby for execution of the switching processing in conformity with the property of each WiFi area.

Furthermore, the aforementioned threshold value of the residence time is a particular elapsed time corresponding to the relative minimum value of the number of times of connections that appears for the first time after the maximum value of the number of times of connections as the elapsed time increases from zero in a histogram with the horizontal axis representing the elapsed time and the vertical axis representing the number of times the communication terminal 20 and the WiFi base station 31 are connected to each other.

This allows for providing an appropriate value to the threshold value that serves as a standard for distinguishing between the short-term stay and the long-term stay in the WiFi area A31, the appropriate value reflecting the tendency of the elapsed time in the WiFi area A31.

[b] Other Embodiments

[1] In the aforementioned embodiment, a description was made, by way of example, to the case in which the first communication scheme was the 3G and the second communication scheme was the WiFi. The 3G communication scheme may include the W-CDMA scheme, the LTE scheme, the LTE-A scheme or the like. Here, the first communication scheme and the second communication scheme are not limited to the 3G and the WiFi. For example, communication schemes available as the first communication scheme or the second communication scheme other than the 3G and the WiFi may include the Global System for Mobile Communications (GSM (registered trade mark)), the Universal Mobile Telecommunications System (UMTS), or Worldwide Interoperability for Microwave Access (WiMax).

[2] In the aforementioned embodiment, a description was made on the assumption that the first communication area equivalent to the 3G area A10 is greater than the second communication area equivalent to the WiFi area A30. However, the magnitude relationship between the first communication area and the second communication area is not limited thereto, and the second communication area may be greater than the first communication area.

[3] In the aforementioned embodiment, a description was made, by way of example, to the case where the entire WiFi areas overlap part of the 3G area. However, even if not the entire WiFi area but part of the WiFi area may overlap part of the 3G area, the technique disclosed herein may also be applicable. Even when the WiFi area and the 3G area do not overlap each other but the boundary of the WiFi area is in contact with the boundary of the 3G area, the technique disclosed herein may also be applicable.

[4] In the aforementioned embodiment, the processing sequence in "the measurement mode" and "the handover restricted mode" may also be followed based on the policy control of the Access Network Discovery and Selection Function (ANDSF).

[5] The aforementioned threshold value of the residence time may also be the average value of a plurality of elapsed times that are measured in advance. For example, the elapsed time measurement unit 15 may also compute, as the threshold value of the residence time, the average value of a plurality of elapsed times less than a predetermined upper limit. This allows for computing the threshold value in a simple manner, thus alleviating the processing load imposed on the computation of the threshold value.

Figure 8:
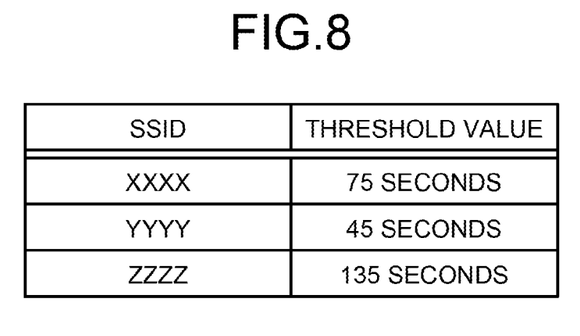
FIG. 8 is a view illustrating an example of a threshold value table according to another embodiment.

[6] The elapsed time measurement unit 15 may also compute the threshold value of the residence time by determining different respective histograms 61 for a plurality of time periods. That is, the elapsed time measurement unit 15 may also compute, as the threshold value, the aforementioned particular elapsed times different from each other for each of the plurality of time periods. For example, the elapsed time measurement unit 15 may also create the threshold value table illustrated in FIG. 7 based on the elapsed times measured during the twelve daytime hours from 6 a.m., and create the threshold value table illustrated in FIG. 8 based on the elapsed times measured during twelve nighttime hours from 6 p.m. FIG. 8 is a view illustrating an example of a threshold value table according to another embodiment. This allows for providing an appropriate value to the threshold value that serves as a standard for distinguishing between the short-term stay and the long-term stay in each WiFi area A30, the appropriate value reflecting the tendency of the elapsed time for each of a plurality of time periods.

Figure 9:
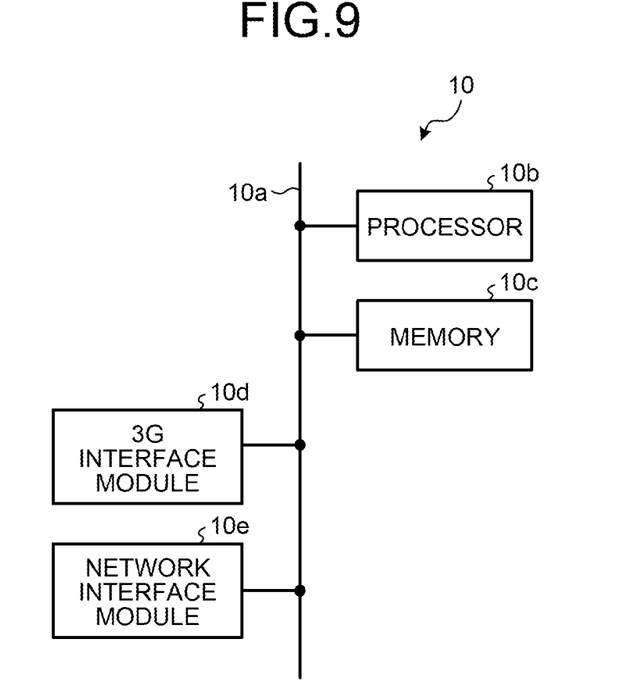
FIG. 9 is a view illustrating an example of a hardware structure of a 3G base station.

[7] The 3G base station 10 of the aforementioned embodiment can be implemented by the following hardware structure. FIG. 9 is a view illustrating an example of a hardware structure of the 3G base station.

As illustrated in FIG. 9, the 3G base station 10 includes hardware components such as a bus 10a, a processor 10b, a memory 10c, a 3G interface module 10d, and a network interface module 10e. Examples of the processor 10b may include the Central Processing Unit (CPU), the Digital Signal Processor (DSP), and the Field Programmable Gate Array (FPGA). Furthermore, the 3G base station 10 may also have a Large Scale Integrated circuit (LSI) that includes the processor 10b and a surrounding circuit. By way of example, the memory 10c may include a RAM such as the SDRAM, a ROM, or a flash memory device. The 3G communication unit 12 and the antenna 11 are implemented by the 3G interface module 10d. The network interface unit 14 is implemented by the network interface module 10e. The communication control unit 13, the elapsed time measurement unit 15, and the broadcast information forming unit 18 are implemented by the processor 10b. The elapsed time recording unit 16 is implemented by the memory 10c. The threshold value table 17 is stored in the memory 10c.

Figure 10:
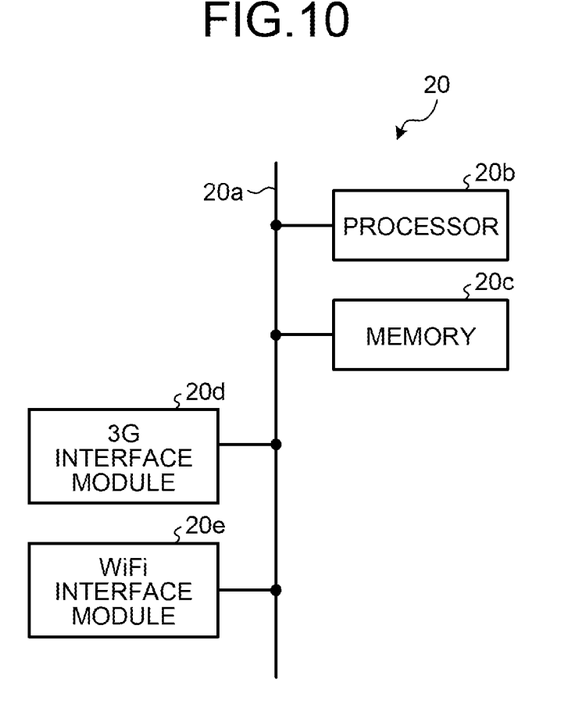
FIG. 10 is a view illustrating an example of a hardware structure of a communication terminal.

The communication terminal 20 of the aforementioned embodiment can be implemented by the following hardware structure. FIG. 10 is a view illustrating an example of a hardware structure of the communication terminal. As illustrated in FIG. 10, the communication terminal 20 has hardware components such as a bus 20a, a processor 20b, a memory 20c, a 3G interface module 20d, and a WiFi interface module 20e. By way of example, the processor 20b may include a CPU, DSP, or FPGA. Furthermore, the communication terminal 20 may also have an LSI that includes the processor 20b and a surrounding circuit. By way of example, the memory 20c may include a RAM such as the SDRAM, a ROM, or a flash memory device. The 3G communication unit 22 and the antenna 21 are implemented by the 3G interface module 20d. The WiFi communication unit 24 and the antenna 23 are implemented by the WiFi interface module 20e. The communication control unit 25 and the residence time measurement unit 27 are implemented by the processor 20b. The threshold value table 26 is stored in the memory 20c.

According to an aspect of the disclosure, it is possible to reduce frequent occurrence of handovers between communication systems employing different communication schemes.

All examples and conditional language recited herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless access system comprising:
   a first communication system that performs communications by a first communication scheme;
   a second communication system that performs communications by a second communication scheme different from the first communication scheme; and
   a communication terminal capable of communicating with both the first communication system and the second communication system, wherein
   a base station of the first communication system measures, before calculating a threshold value, an elapsed time from a first point in time at which the communication terminal previously enters a second communication area that is an area of the second communication system to a second point in time at which the communication terminal previously exits from the second communication area to a first communication area that is an area of the first communication system, calculates the threshold value based on the measured elapsed time, and transmits, to the communication terminal, the calculated threshold value, and
   the communication terminal receives the calculated threshold value from the base station of the first communication system while staying in the first communication area of the first communication system and inhibits a start of connection to the second communication area until a point in time at which an elapsed time after reception strength in the second communication area meets a predetermined condition exceeds the calculated threshold value when the reception strength in the second communication area meets the predetermined condition,
   wherein the calculated threshold value is a particular elapsed time corresponding to a relative minimum value that appears for the first time after the maximum value as the measured elapsed time increases from zero in a histogram with a horizontal axis representing the measured elapsed time and a vertical axis representing a number of times the communication terminal and a base station forming the second communication area are connected to each other.

2. The wireless access system according to claim 1, wherein the communication terminal inhibits the start of connection to the second communication area based on the measured elapsed time corresponding to the second communication area in which the communication terminal is staying among a plurality of second communication areas.

3. The wireless access system according to claim 1, wherein the calculated threshold value is the particular elapsed times which are different for a plurality of time periods.

4. The wireless access system according to claim 1, wherein the calculated threshold value is an average value of a plurality of elapsed times measured in advance.

5. A base station that forms a first communication area of a first communication system by a first communication scheme, the base station comprising:
   a memory;
   a processor coupled to the memory; and
   an interface module that transmits a threshold value to a communication terminal, wherein the processor executes a process comprising:
      measuring, before calculating the threshold value, an elapsed time from a first point in time at which the communication terminal previously enters a second communication area of a second communication system that performs communications by a second communication scheme different from the first communication scheme to a second point in time at which the communication terminal previously exits from the second communication area to the first communication area, the communication terminal being capable of communicating with both the first communication system and the second communication system; and calculating the threshold value based on the measured elapsed time, wherein the calculated threshold value is a particular elapsed time corresponding to a relative minimum value that appears for the first time after the maximum value as the measured elapsed time increases from zero in a histogram with a horizontal axis representing the measured elapsed time and a vertical axis representing a number of times the communication terminal and a base station forming the second communication area are connected to each other.

6. A communication terminal capable of communicating with both a first communication system that performs communications by a first communication scheme and a second communication system that performs communications by a second communication scheme different from the first communication scheme, the communication terminal comprising:

a memory;

a processor coupled to the memory; and an interface module that receives, while the communication terminal stays in a first communication area of the first communication system, a threshold value from a base station that forms the first communication area by the first communication scheme, the base station measuring, before calculating the threshold value, an elapsed time from a first point in time at which the communication terminal previously enters a second communication area of the second communication system to a second point in time at which the communication terminal previously exits from the second communication area to the first communication area, calculating the threshold value based on the measured elapsed time, and transmitting the threshold value to the communication terminal, wherein the processor executes a process comprising inhibiting a start of connection to the second communication area until a point in time at which an elapsed time after reception strength in the second communication area meets a predetermined condition exceeds the received threshold value when the reception strength in the second communication area meets the predetermined condition, wherein the calculated threshold value is a particular elapsed time corresponding to a relative minimum value that appears for the first time after the maximum value as the measured elapsed time increases from zero in a histogram with a horizontal axis representing the measured elapsed time and a vertical axis representing a number of times the communication terminal and a base station forming the second communication area are connected to each other.

* * * * *